May 10, 1966  S. V. FRANCKOWIAK  3,249,954
PORTABLE COMBINED OILER AND CHIP CATCHER FOR ROTARY
METAL CUTTING MACHINES
Filed July 27, 1964  4 Sheets-Sheet 1
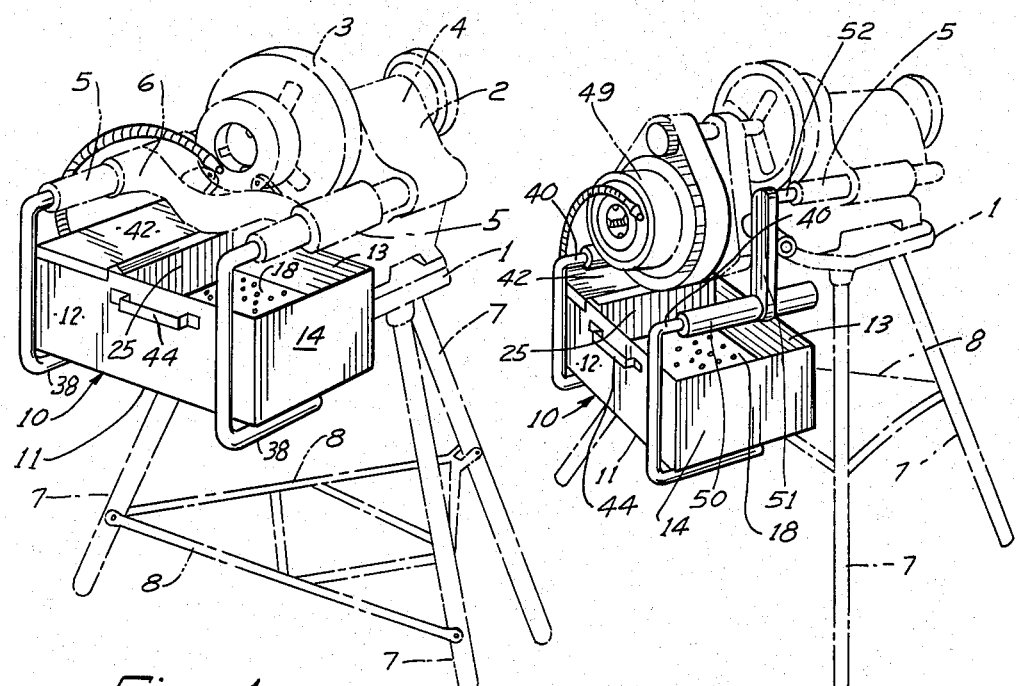
Fig. 1.
Fig. 8.
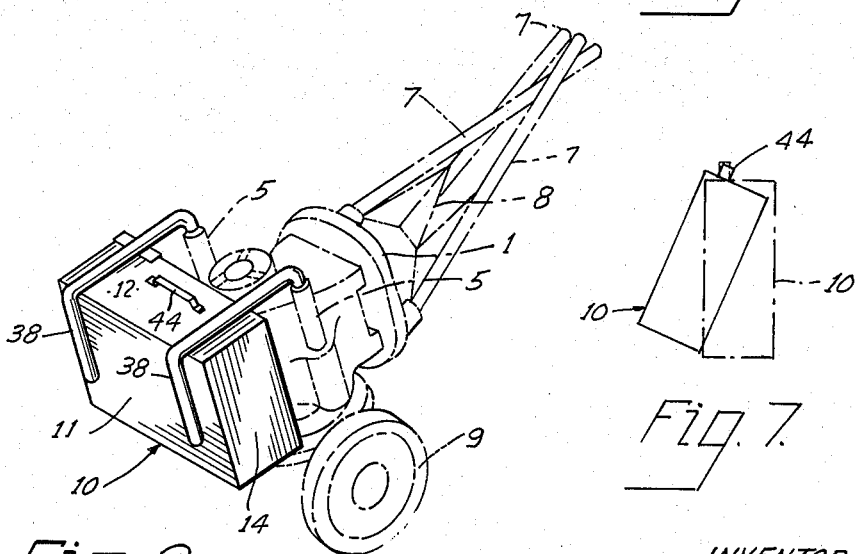
Fig. 2.
Fig. 7.
INVENTOR.
Stanley V. Franckowiak,
BY
John H. Leonard,
his ATTORNEY.

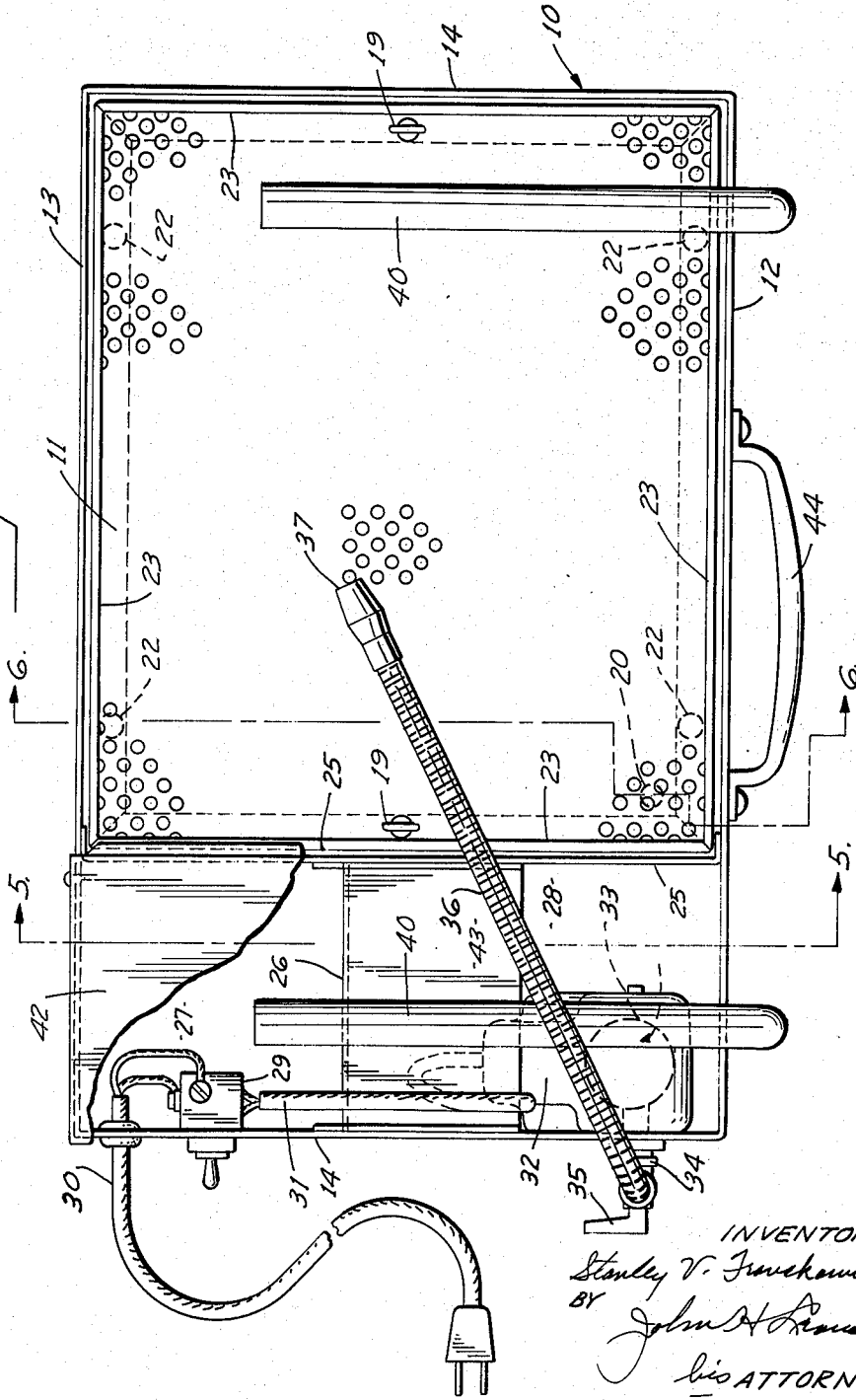

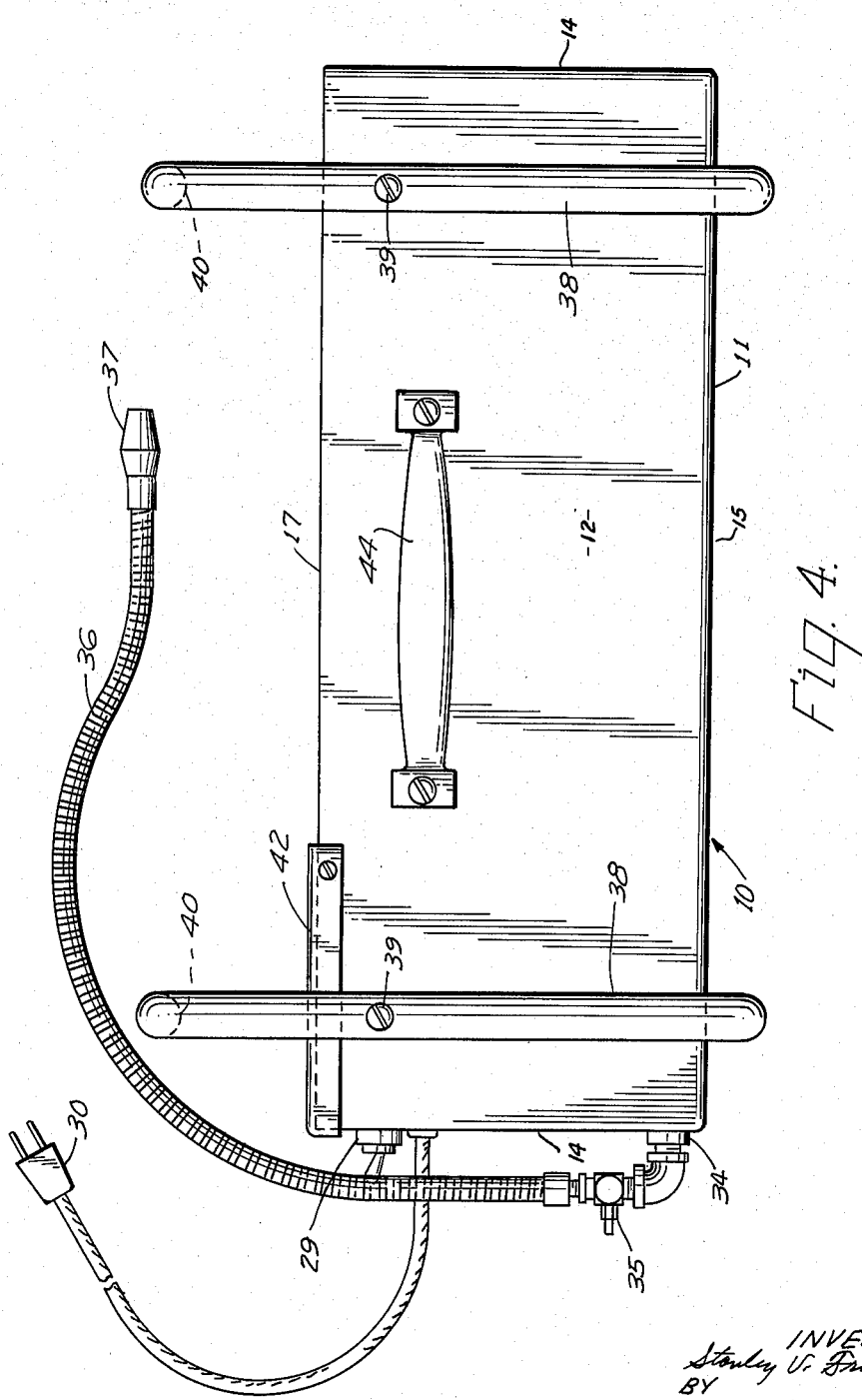

United States Patent Office 3,249,954
Patented May 10, 1966

3,249,954
PORTABLE COMBINED OILER AND CHIP CATCHER FOR ROTARY METAL CUTTING MACHINES
Stanley V. Franckowiak, 5707 Francis Ave., Cleveland, Ohio
Filed July 27, 1964, Ser. No. 385,181
11 Claims. (Cl. 10—106)

This invention relates to a portable combined oiler and chip catcher for use on rotary cuting machines, and particularly for use in a conventional power driven portable threading machine such, for example, as used by pipe fitters at construction sites, or in small machine shops or in servicing facilities.

For purposes of illustration, the machine will be described specifically as applied to a machine of this character, its use on other types of machines being readily apparent from the illustrative example.

In threading and cutting machines of the stationary type, it has long been customary to provide a suitable well or sump within the base of the machine into which the chips and oil or liquid coolant are discharged during cutting. The sump is such that the chips are retained on a suitable drain and the coolant is permitted to drain therefrom into a collecting basin for eventual reuse.

In the usual portable power driven threading machine, no provision is made for chip collection and recovery of the coolant. Instead, only a small amount of oil is applied on the tool and workpiece being threaded and the coated chips are permitted to fall in a suitable disposable container or onto the floor. The application of coolant in a substantially continuous stream is not attempted, largely because no provision has been made for its recovery so that the waste would become excessive, and the work site would become covered with chips and oil.

In accordance with the present invention, a portable combined oiler and chip catcher is provided which can readily be placed on such a portable threading machine, which supplies a continuous stream of coolant onto the workpiece at the threading throat, which catches the chips and coolant resulting from the cutting operation, which separates the coolant from the chips so that the coolant can be recirculated, and which can be removed readily and carried without danger of spilling the coolant or the chips.

Various other objects and advantages will become apparent from the following description, wherein reference is made to the drawings, in which FIGURE 1 is a diagrammatic illustration of a portable power operated rotary pipe threading machine with the combined oiler and chip catcher of the present invention installed in operating position thereon;

FIG. 2 is a view of the machine showing it in condition for transportation, with the combined oiler and chip catcher installed thereon;

FIG. 3 is an enlarged top plan view of the combined oiler and chip catcher;

FIG. 4 is a front elevation of the structure illustrated in FIG. 3;

Figure 5:
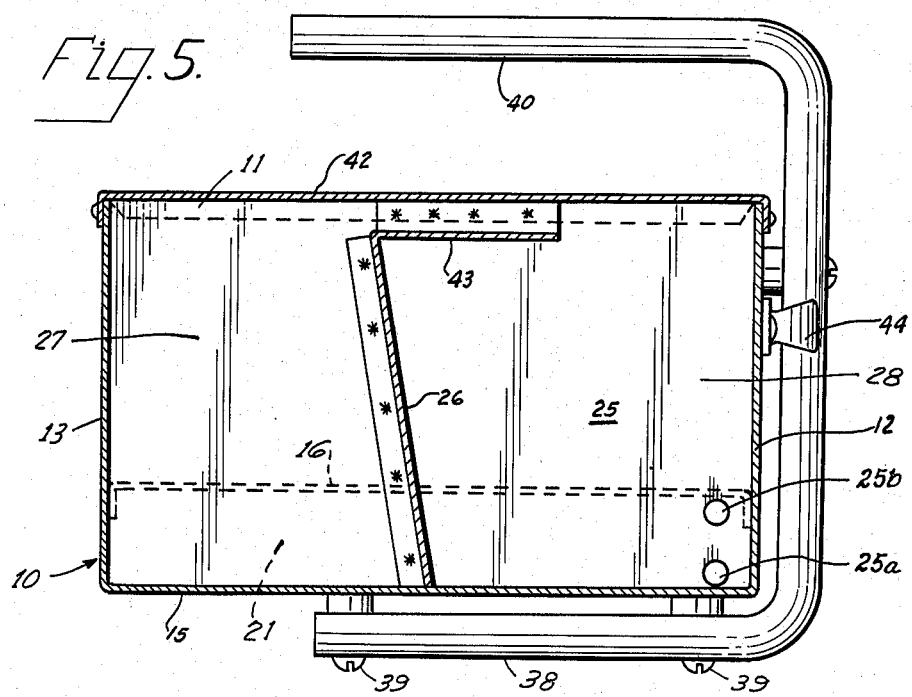
Figure 6:
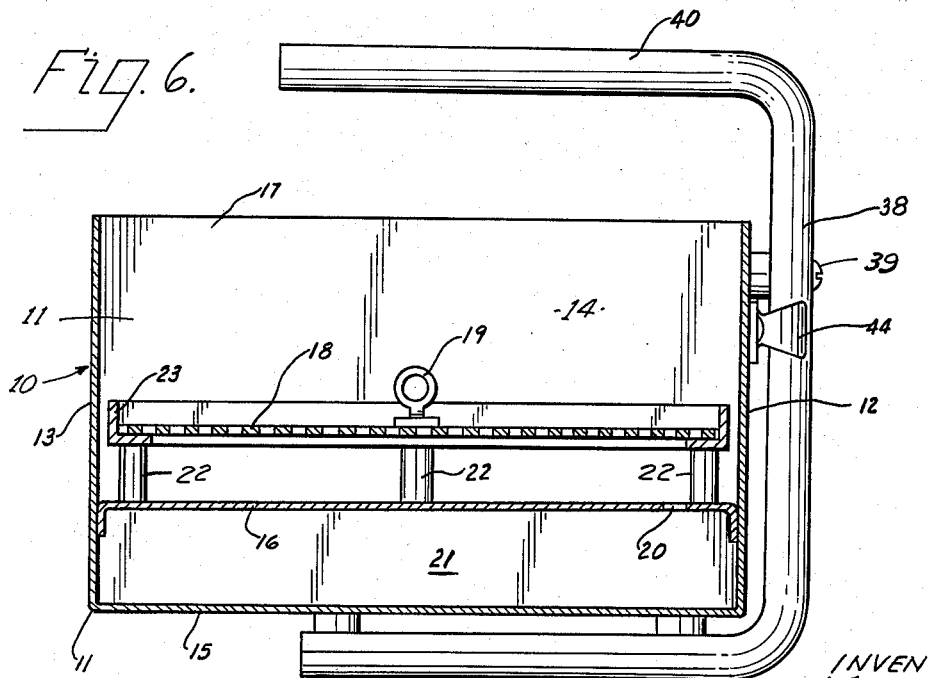

FIGS. 5 and 6 are vertical sectional views taken on lines 5—5 and 6—6, respectively, in FIG. 3;

FIG. 7 is a diagrammatic end elevation of the chip catcher and oiler, showing its position when supported by its handle; and FIG. 8 is a view similar to FIG. 1, showing a modification of the support for the combined oiler and chip catcher.

Referring first to FIG. 1, the threading machine comprises a base 1 on which is carried a body 2 which supports a rotatable chuck 3 driven by a motor, within the body 2, through suitable reduction gears 4. Carried by the body are two forwardly extending parallel horizontal tubular guides 5 on which a saddle 6 is mounted for movement toward and away from the chuck 3 in a direction parallel to the axis of the rotation of the chuck.

A cutter of the type required for the particular pipe, not shown, is mounted on the saddle 6 and is moved by moving the saddle along the guides 5 into position for threading the pipe being rotated by the chuck 3.

The base 1 is generally supported at proper standing working level by legs 7 which are mounted for swiveling movement on the base 1. The legs 7 can be connected together by suitable stay-bracing, indicated at 8, so as to form a rigid tripod for supporting the base 1. This stay-bracing 8 can be detached and the legs 7 folded, as indicated in FIG. 2, when it is desired to transport the machine. In such case, a pair of coaxial wheels, one of which wheels is indicated at 9, is mounted on a suitable axis having a stub shaft, not shown, which is gripped in the chuck 3, thus providing a wheel support for moving the machine from place to place. The machine thus far described is conventional and readily available on the market.

In order to supply coolant to the tool and workpiece during the threading operation, and to catch the chips and excess coolant, a combined oiler and chip catcher 10 is provided. The chip catcher 10 comprises a container 11 which is open at the top for receiving chips when the catcher is supported in its normal operating position. The container has a front wall 12, a rear wall 13, end walls 14, and a bottom wall 15, these walls being securely fastened together in sealed relation. The container 11 is provided also with a false bottom 16, spaced a short distance above the bottom wall 15 and considerably below the open top, indicated at 17, of the container 11. Supported in the container in spaced relation below the open top 17, and preferably in spaced relation above the false bottom 16, is a drain 18 in the form of a screen. The screen is provided with eye-bolts 19 by which it can readily be lifted out of the container for dumping. The screen is so arranged that when chips and coolant fall thereonto, the coolant can separate from the chips and drain through the screen 18 onto the false bottom 16. The false bottom 16 is provided with a drain means. In the form illustrated, the drain means is shown as a single hole 20 through which oil discharged onto the false bottom can drain into the collecting compartment 21, which is defined by the bottom 15, false bottom 16 and portions of the front, rear and side walls of the container. To assure free flow of the coolant over the false bottom 16 to the drain hole 20, the screen 18 may be supported above the level of the false bottom 16 by means of suitable legs 22 of a screen supporting frame 23.

Within the container, adjacent to but spaced from one end, is an upright transverse partition wall 25 which extends from the rear to the front of the container. The wall 25 is in sealed relation to the front wall 12, rear wall 13, bottom wall 15 and false bottom 16. The wall 25 preferably extends from the open top of the container entirely to the bottom wall 15. The drain 18 and false bottom 16 terminate endwise of the container at the transverse partition wall 25. The wall 25 has a drain hole 25a and an air vent 25b, for purposes later to be described herein.

Near one end of the container 11 a longitudinal upright partition wall 26 extends from partition wall 25 to the adjacent end wall 14, and preferably is coextensive in height with the transverse partition wall 25. The wall 26 is in sealed relation to the wall 25, the adjacent end wall 14, and the bottom wall 15. Thus the walls 25 and 26 divide the adjacent end of the container into two isolated compartments 27 and 28.

Mounted in the compartment 27 is an electric switch 29 which is connected to the usual plug-in cord 30. A lead 31 passes through the longitudinal partition wall 26 in sealed relation thereto and extends into the compartment 28. Within the compartment 28 is a motor driven pump 32, the motor of which is connected by the lead 31 to the switch 29 and therethrough to a source of power. The pump 32 has an inlet 33 which preferably is disposed adjacent to the bottom wall 15 of the compartment 28. The pump has an outlet 34 connected through a suitable control valve 35 to a flexible armored hose 36, at the discharge end of which is a discharge nozzle 37. The hose is preferably of the type armored by a spiral metal wrapping which is sufficiently tight so that when the hose is bent to dispose the nozzle 37 at the position desired the hose will retain the nozzle in such a position while under the pressure of the coolant supplied by the pump. The nozzle 37, of course, is moved to the proper position relative to the cutting tool and workpiece to assure flooding of the metal surface being cut and the tool with coolant during the cutting operation. In the normal position of the chip catcher, the nozzle 37 overhangs the open top of the container 11.

In order to connect the pump to the supply of coolant in the compartment 21, the drain hole 25a, heretofore mentioned is provided in the upright transverse partition wall 25. Likewise, in order to prevent the entrapment of air beneath the false bottom 16, the air hole or vent 25b, heretofore mentioned is provided in the wall 25. The drain hole 25a is preferably adjacent the bottom wall 15 and the vent 25b is arranged adjacent the underside of the false bottom 16. Both the hole 25a and vent 25b are closely adjacent the forward wall 12 of the container, for purposes to be described.

In order to support the container conveniently on a machine such as described, it is provided with brackets 38 which may be in the form of U-shaped tubes connected by screws 39 to the underside of the container 11. The tubes extend upwardly along the forward wall 12 of the container and at the upper ends provide horizontal arms 40 overhanging the container. The arms 40 are of proper size to fit into the tubular guides 5 of the machine. Thus, as illustrated in FIGURE 1, they normally support the chip catcher 10 in the proper position to receive the chips and coolant during the threading operation.

The compartments 27 and 28 are closed at the top by a detachable cover 42. This cover, however, need not be liquid tight. At the end of the longitudinal upright partition wall 26, a suitable baffle wall 43 is provided. The baffle wall 43 is in sealed relation to the upper edge of the wall 26 and to the adjacent end wall 14 and upright partition wall 25. The baffle wall 43 extends from the wall 26 toward the front wall 12 of the container. The front wall 12 of the container is provided with a handle 24 by which the chip catcher and oiler can be carried manually when desired. The location of the handle 44, the holes 20 and 25a, and vent 25b, and their relation to each other, are important for suitable operation. It is to be noted that the handle 44 is preferably near the longitudinal midportion of the container. However, it is nearer the open top 17 of the container than to the bottom 15, instead of being balanced midway between the top and bottom. The purpose of this is apparent from FIGURE 7.

By grasping the handle 24 in the hand for carrying the container 11, the offset of the handle toward the open top 17 causes the container to swing from the position illustrated in dotted lines in FIGURE 7, to the position illustrated in solid lines. In this latter position, it is to be noted, that the open top of the container slopes downwardly from the handle on and oblique to the vertical, in such manner that the drain 18 and the open top 17 of the container face partially upwardly so that the chips cannot fall out readily, as would be the case were the open top in a vertical plane. As mentioned, the holes 20 and 35 and vent 36 are placed near the solid wall. In this oblique position, when the container is supported by the handle 44, the coolant which has already drained through the drain hole 20 is trapped in the compartment 21. It cannot drain out of the hole 20 which is now at the top of the container and thus cause an overflow. Further, it cannot drain through the hole 25a and vent 25b into the compartment 28. The chips are retained on the drain because of the bias slope of the open top of the containers from the handle 44. Thus all drain holes are above the level of the contained coolant, in the compartment 21.

However, there may be a substantial amount of oil in the compartment 28 at the time the container 11 is lifted by the handle 44. This amount cannot be more than can be accommodated, when the container 11 is supported by the handle 44, in the space defined by the longitudinal upright partition wall 26, the baffle wall 43, and the adjacent end wall 25. Hence coolant cannot enter the compartment 27 in which the switch is located. It is desirable that this condition be maintained so that there is little danger of contamination of the switch.

It is quite apparent, therefore, that one can readily remove oiler and chip catcher from the machine by gripping the handle 44 and lifting the container thereby. When the container is removed, it assumes a position in which spillage of chips is reduced to a minimum and the coolant is entrapped for future use. On the other hand, if one desires, instead of emptying the catcher, to leave it on the machine for transport with the machine, then it will take the position illustrated in FIGURE 2, which is approximately the same position as would be obtained by supporting it from the handle 44. Thus again, the spillage of chips will be reduced to a minimum and the coolant will be retained.

In some cases, on portable machines such as illustrated in FIGURE 1, a larger rotary driving chuck 49 is employed. When such is employed, it is mounted on the machine so that its axis is below the normal axis of the chuck 3. In such case, in order to support the oiler and chip catcher properly, there must be a support in a position beneath that shown in FIGURE 1. For this purpose, supplemental holders are provided. These comprise tubular members 50 arranged to receive the arms 40 of the chip catcher. Mounted on these tubular members 50 and extending normal to the axis thereof, are arms 51, on the upper end of which are carried arms 52. The arms 52 are parallel to the members 50 and are essentially of the same diameter and length as the arms 40 heretofore described. Thus the arms 52 can be received in the conventional guides 5 for supporting the chip catcher at the lower level desired beneath the rotatable chuck 49.

It is apparent from the foregoing description that the combined chip catcher and oiler is one which can be readily applied to a machine of the general type described, or it can be set on the floor or on a bench beneath the cutting tool of a machine. When in operation in such location it can deliver a continuous stream of coolant to the cutting site and receive the chip sand excess coolant, and permit the coolant to drain out of the chips for recirculation.

The total charge of coolant for the container depends upon the particular job, but usually about one or two quarts of coolant are adequate as the coolant drains out of the chips readily enough so that a continued circulation can be maintained throughout normal cutting operations.

On the other hand, the combined oiler and chip catcher can be removed and transported by hand for dumping of the coolant or chips, or it can be transported without dumping, on the machine, without danger of spillage of chips and coolant, and thus can be used until a convenient place is afforded for dumping. The coolant can be used over many times, and if desired, a suitable filter can be provided between the compartment 21 and the pump inlet so as to prevent any chips from being drawn into the pump. Furthermore, in cold weather, a conventional electric heating element may be installed in the compartment 21 for warming the coolant temporarily until it is sufficiently warmed by the cutting operation.

Having thus described my invention, I claim:

1. A portable oiler and chip catcher comprising an upright open top container having a bottom wall, a false bottom therein spaced above the bottom wall, and having a drain hole therethrough, a drain in the container below the open top and in overlying relation to the false bottom, a motor driven pump in the container having an inlet for receiving oil from the space between the false bottom and bottom wall, a directable discharge conduit connected to the pump outlet, and supporting means adapted for supporting the container beneath a machine cutting tool in upright position wherein its open top is exposed upwardly for receiving chips and coolant by gravity.

2. An apparatus according to claim 1 wherein the container has a carrying handle on one of its side walls near the longitudinal midportion of the container, and said drain hole in the false bottom is near the side wall to which the handle is secured.

3. An apparatus according to claim 2 wherein said handle is nearer to the open top of the container than to the bottom of the container whereby, when the container is suspended by the handle, the open top is oblique to the vertical and slopes outwardly downwardly from the vertical from the edge adjacent the handle to the opposite edge and faces partially upwardly.

4. An apparatus according to claim 2 wherein a sump compartment is provided at one end of the container adjacent one side wall and is connected with the space beneath the false bottom at a location near the bottom of the container and near said one side wall, said compartment has a wall in face to face spaced relation to said one side wall and forming the bottom of the compartment when the container is suspended by said handle, and said compartment is sealed from its said bottom upwardly at least a substantial distance partway toward said one side wall.

5. An apparatus according to claim 2 wherein a transverse partition wall is disposed in the container in spaced relation to one end of the container and extends from the bottom wall toward the open top to a location above the level of the false bottom and provides an end compartment extending transversely of the container, the pump and motor are in said compartment, the pump inlet is naer the bottom wall in said compartment, a longitudinal partition wall extends from said transverse partition wall to said one end of the container and from the bottom at least to the level of the false bottom, an upper baffle wall extends from the longitudinal partition wall toward the side one wall and from the transverse partition wall and said one end of the container, and said transverse partition wall has a port which is near to the bottom of the container and near to said one side wall.

6. An apparatus according to claim 5 wherein said transverse partition wall has an air vent near the level of, and below, the false bottom adjacent said one side wall.

7. An apparatus according to claim 1 wherein said supporting means includes a pair of rigid elongated arms, means connected to the container and supporting the arms in parallel coplanar relation in spaced relation above the open top of the container and extending transversely of the container.

8. A portable oiler and chip catcher comprising a container having upright enclosing walls, an open top, a bottom wall, and a false bottom between and spaced from the top and from the bottom wall, said false bottom having a drain means leading to the space between the bottom wall and false bottom, said drain means being arranged to drain liquid from on top of the false bottom into said compartment when the container is disposed with its top upwardly and to prevent return of the liquid through the drain means when the container is supported with one of said enclosing walls at the top, a carrying handle on said one of the enclosing walls arranged to suspend the container with said one of the enclosing walls at the top and said false bottom being sealed at its periphery to the enclosing walls so that, said walls and false bottom form a compartment between the false bottom and bottom wall which is sealed from the space above the false bottom except for the drain means when the container is supported by the handle.

9. An apparatus according to claim 8 wherein the handle is arranged nearer to the open top of the container than to the bottom wall.

10. An apparatus according to claim 8 wherein a motor driven pump is carried by the container and has an inlet in communication with the compartment, and a directable hose connected to the pump outlet.

11. An apparatus according to claim 8 wherein supporting means in addition to the handle are connected to the container and extend upwardly from said one enclosing wall and then in overhanging relation to the open top toward the opposite enclosing wall, said supporting means terminating in free ends which are in spaced relation above said opposite enclosing wall so as to be accessible from the free ends for connection to an associated machine.

References Cited by the Examiner

UNITED STATES PATENTS 1,716,919  6/1929  Drissner et al.
1,917,831  7/1933  Fairbairn _____ 77—55 X ANDREW R. JUHASZ, *Primary Examiner.*